United States Patent
Iinuma

(10) Patent No.: US 8,970,897 B2
(45) Date of Patent: Mar. 3, 2015

(54) IMAGE PROCESSING APPARATUS, IMAGE PROCESSING METHOD, AND PROGRAM PERFORMING COLOR MATERIAL REDUCTION PROCESSING ON OBJECTS

(71) Applicant: Canon Kabushiki Kaisha, Tokyo (JP)

(72) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 13/773,588

(22) Filed: Feb. 21, 2013

(65) Prior Publication Data

US 2013/0235392 A1    Sep. 12, 2013

(30) Foreign Application Priority Data

Mar. 8, 2012   (JP) ................. 2012-051716

(51) Int. Cl.
   *G06K 15/02*   (2006.01)
   *G06K 15/14*   (2006.01)
   *G03G 15/00*   (2006.01)
   *G06K 15/00*   (2006.01)

(52) U.S. Cl.
   CPC ............. *G06K 15/14* (2013.01); *G03G 15/50* (2013.01); *G06K 15/005* (2013.01); *G06K 15/1871* (2013.01)

USPC ........................... 358/1.2; 358/1.9; 358/1.1

(58) Field of Classification Search
   USPC ............................ 358/1.2, 1.1, 1.9
   See application file for complete search history.

(56) References Cited

U.S. PATENT DOCUMENTS

| 8,284,451 | B2 | 10/2012 | Misawa et al. | |
| 2004/0223174 | A1* | 11/2004 | Mikami | 358/1.9 |
| 2007/0153308 | A1* | 7/2007 | Zemach et al. | 358/1.9 |
| 2009/0073462 | A1* | 3/2009 | Yamauchi | 358/1.2 |
| 2010/0053648 | A1 | 3/2010 | Iinuma | |

FOREIGN PATENT DOCUMENTS

| JP | 2001-083845 A | 3/2001 |
| JP | 2006-235237 A | 9/2006 |

* cited by examiner

*Primary Examiner* — Martin Mushambo
(74) *Attorney, Agent, or Firm* — Fitzpatrick, Cella, Harper & Scinto

(57) ABSTRACT

An image processing apparatus and an image processing method are provided for allowing a user to achieve a desired image quality while controlling toner consumptions. An amount of toner reduced is calculated based on a set toner reduction rate. For objects other than an object specified as an excluded object to which toner reduction is not applied, a toner reduction rate for achieving the calculated amount of toner saved is calculated.

9 Claims, 18 Drawing Sheets

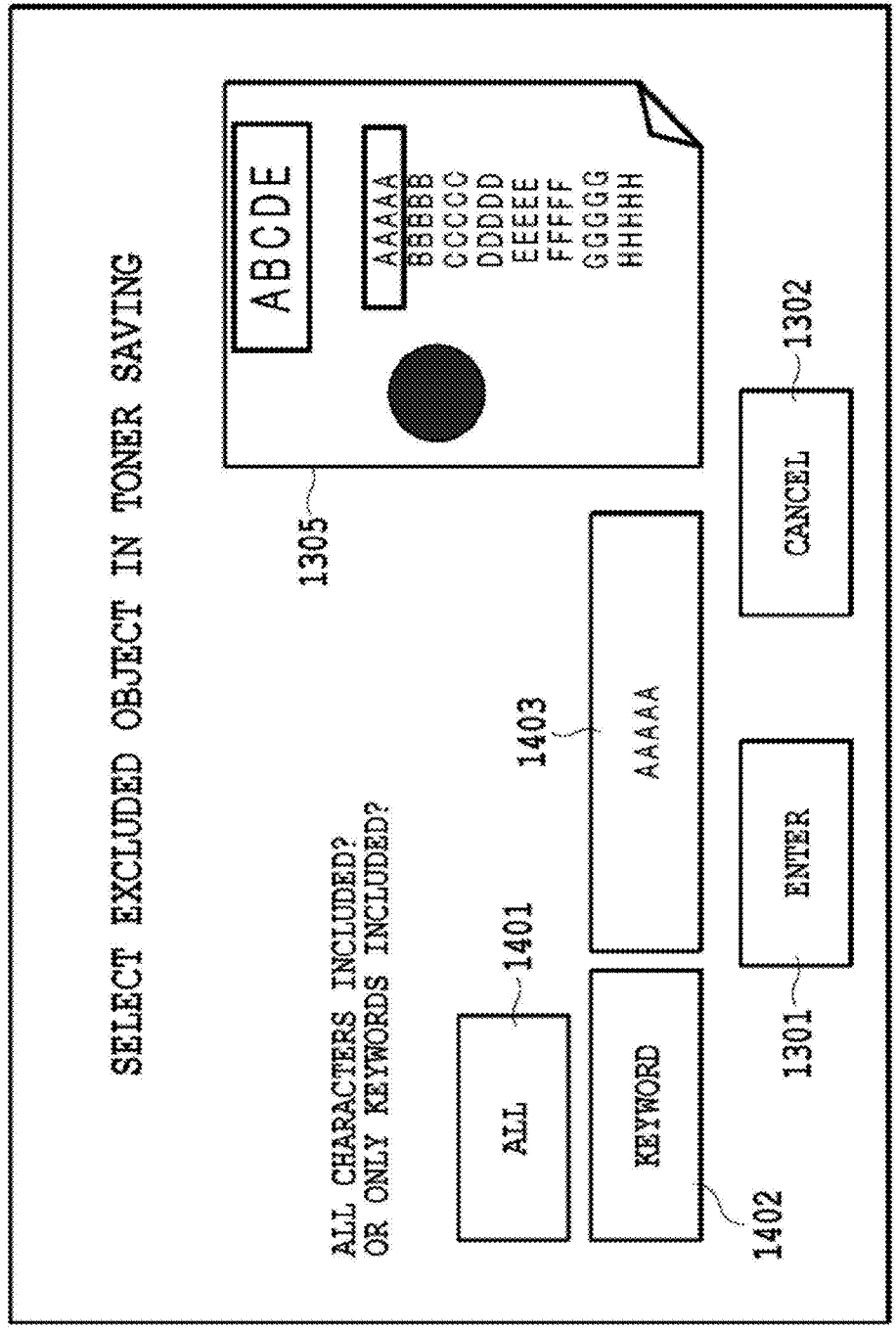

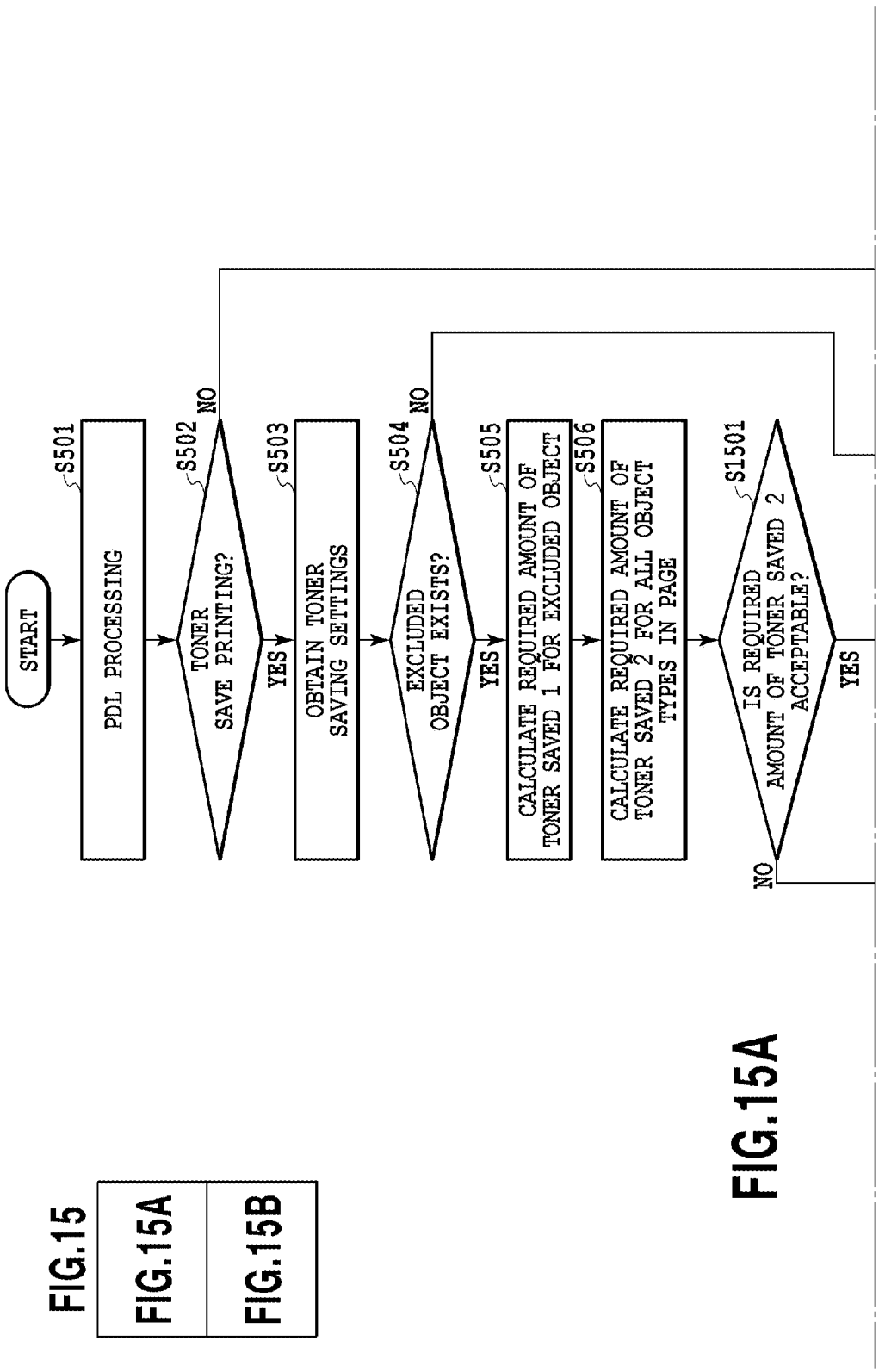

IMAGE PROCESSING APPARATUS, IMAGE PROCESSING METHOD, AND PROGRAM PERFORMING COLOR MATERIAL REDUCTION PROCESSING ON OBJECTS

BACKGROUND OF THE INVENTION

1. Field of the Invention

The present invention relates to an image processing apparatus and an image processing method for digitally generating and controlling image data for forming an image on a sheet, and a program for executing image processing.

2. Description of the Related Art

In an image forming apparatus, a processing mode for reducing color material consumption, a so-called toner save mode, is widely known as a function that lowers print density and reduces printing costs. In recent years, even for the processing in the toner save mode, an image quality equal to that available in ordinary printing is required while reducing printing costs.

One such processing method is to retain a plurality of tables for toner saving used in printing so that an image having a quality equal to that available in ordinary printing can be obtained even by the processing in the toner save mode (see, for example, Japanese Patent Laid-Open No. 2006-235237). Another processing method is to switch toner saving methods to an appropriate method for each object included in a document to be printed (to thin out pixels for a predetermined period or to use a gamma modification table for toner saving) (see, for example, Japanese Patent Laid-Open No. 2001-083845).

SUMMARY OF THE INVENTION

In the above-mentioned conventional techniques, however, in reducing toner consumption, although it is possible to perform toner saving processing while maintaining visibility of a specific type of object, it is impossible to reduce toner consumption by a set amount. In recent years, in addition to maintaining an image quality equal to that available in ordinary printing, strict control of toner consumption is required. Therefore, the problem is that the control of toner consumption and the image quality that a user desires (the image quality equal to that available in ordinary printing) must be achieved at the same time. The present invention has been made to achieve an image quality that a user desires while strictly controlling a set amount of toner saved.

An image processing apparatus of the present invention includes an obtaining unit for obtaining a reduction rate of a color material as a first reduction rate in a case where a mode is set to reduce an amount of color material used for printing; a selection unit for selecting at least one object on which color material reduction processing is not performed from objects included in image data to be printed; a calculation unit for calculating an amount of color material reduced when reducing an amount of color material used for printing the objects included in the image data at the first reduction rate; and a processing unit for performing color material reduction processing on objects other than the selected object such that an amount of color material used for printing the objects other than the selected object is reduced by the amount of color material reduced which is calculated by the calculation unit while not performing the color material reduction processing on the selected object.

In accordance with the present invention, an image processing apparatus, an image processing method, and a program can be provided to achieve an image quality that a user desires while maintaining a set reduction rate of color material even in the case of selecting an object on which color material reduction processing is not performed.

Further features of the present invention will become apparent from the following description of exemplary embodiments (with reference to the attached drawings.)

BRIEF DESCRIPTION OF THE DRAWINGS

FIG. 14 shows an exemplary screen displayed on the UI unit;

FIG. 15 is a diagram showing the relationship between FIGS. 15A and 15B;

FIG. 15A is a flow chart showing an outline of processing in accordance with one embodiment;

DESCRIPTION OF THE EMBODIMENTS

First Embodiment

A first embodiment describes control of processing in an image processing apparatus by which settings of an amount of toner saved are controlled and an image quality that a user desires can be ensured.

[Description of the Outline of the General Configuration]

Figure 1:
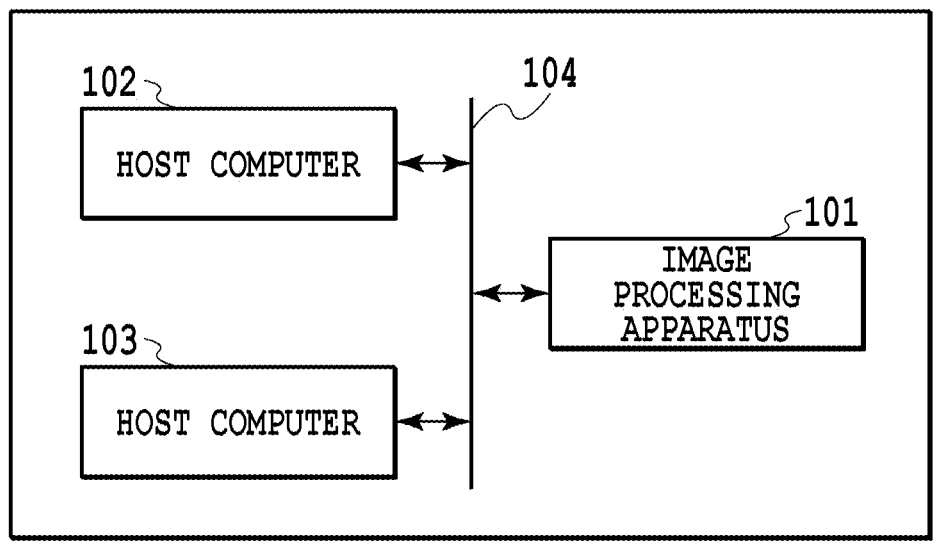
FIG. 1 is a schematic view showing a system configuration.

FIG. 1 is a schematic view showing a configuration of a system having an image processing apparatus 101, a host computer 102, and a host computer 103 for achieving toner saving.

The image processing apparatus 101 can provide printouts from the host computer 102 and the host computer 103 that receive instructions via a network 104. Further, the image processing apparatus 101 can send image data read by utilizing an image reading apparatus provided with the image processing apparatus 101 to the host computer 102 and the host computer 103. Still further, the image processing apparatus 101 can print the read image data (copy operation) by utilizing a printer provided with the image processing apparatus 101.

In this embodiment, it is assumed that the host computer 102 or 103 sends instructions of printing, but not limited thereto. This embodiment can also be applied to the copy operation that uses the image processing apparatus 101.

[Process of Instructions for Toner Save Printing]

Figure 2:
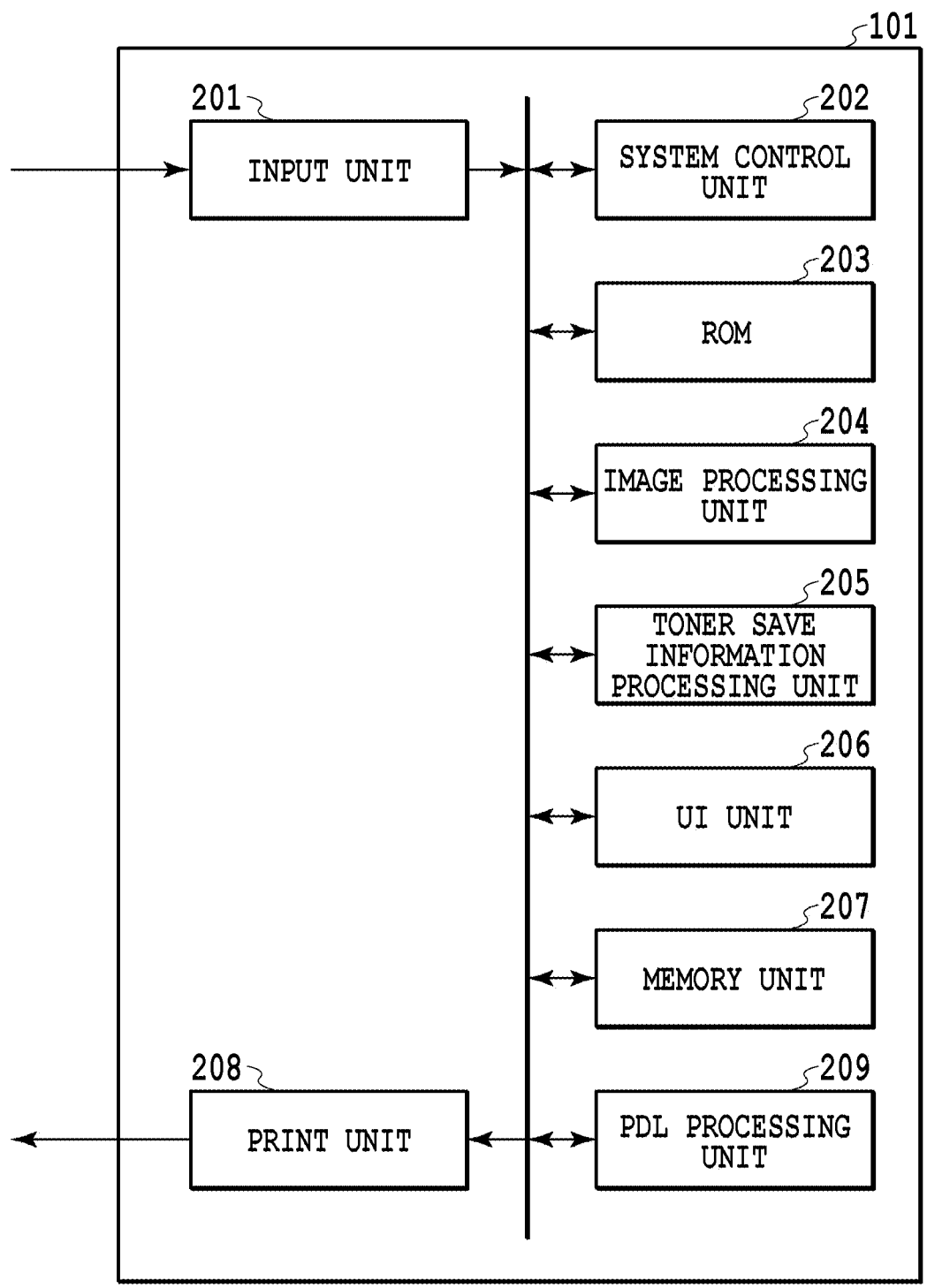
FIG. 2 is a block diagram showing a configuration of an apparatus.

FIG. 2 is a block diagram showing a configuration of the image processing apparatus 101. The image processing apparatus 101 includes an input unit 201, a system control unit 202, a ROM 203, an image processing unit 204, a toner save information processing unit 205, a UI unit 206, a memory unit 207, an output unit 208, and a PDL processing unit 209.

Figure 6:
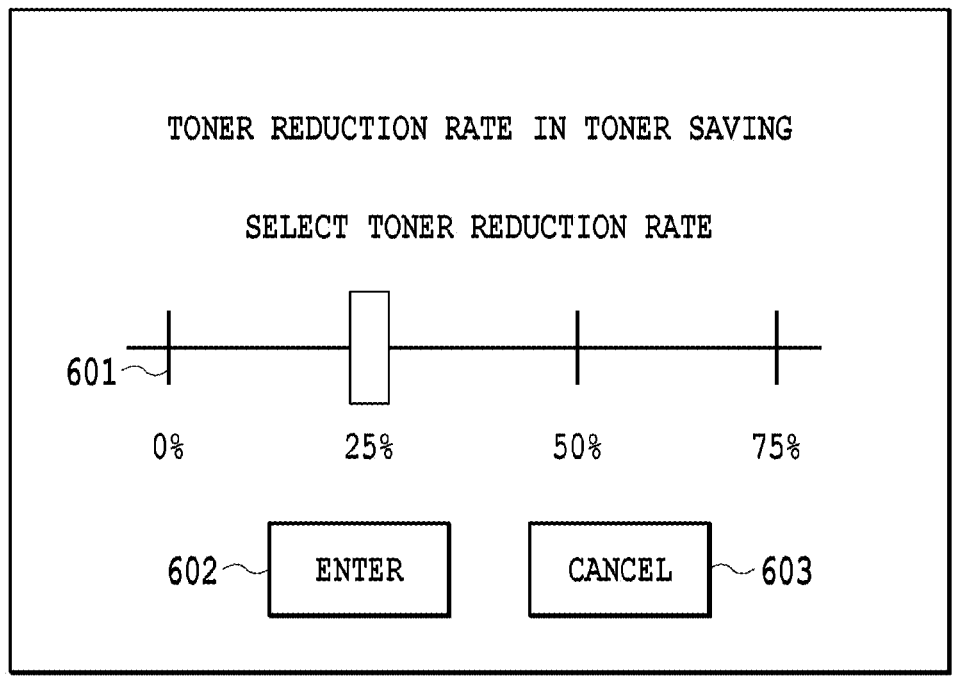
FIG. 6 shows an exemplary screen displayed on a UI unit.

FIG. 6 shows an exemplary screen displayed on monitors of the host computers 102 and 103 or the UI unit 206 of the image processing apparatus 101.

Figure 3:
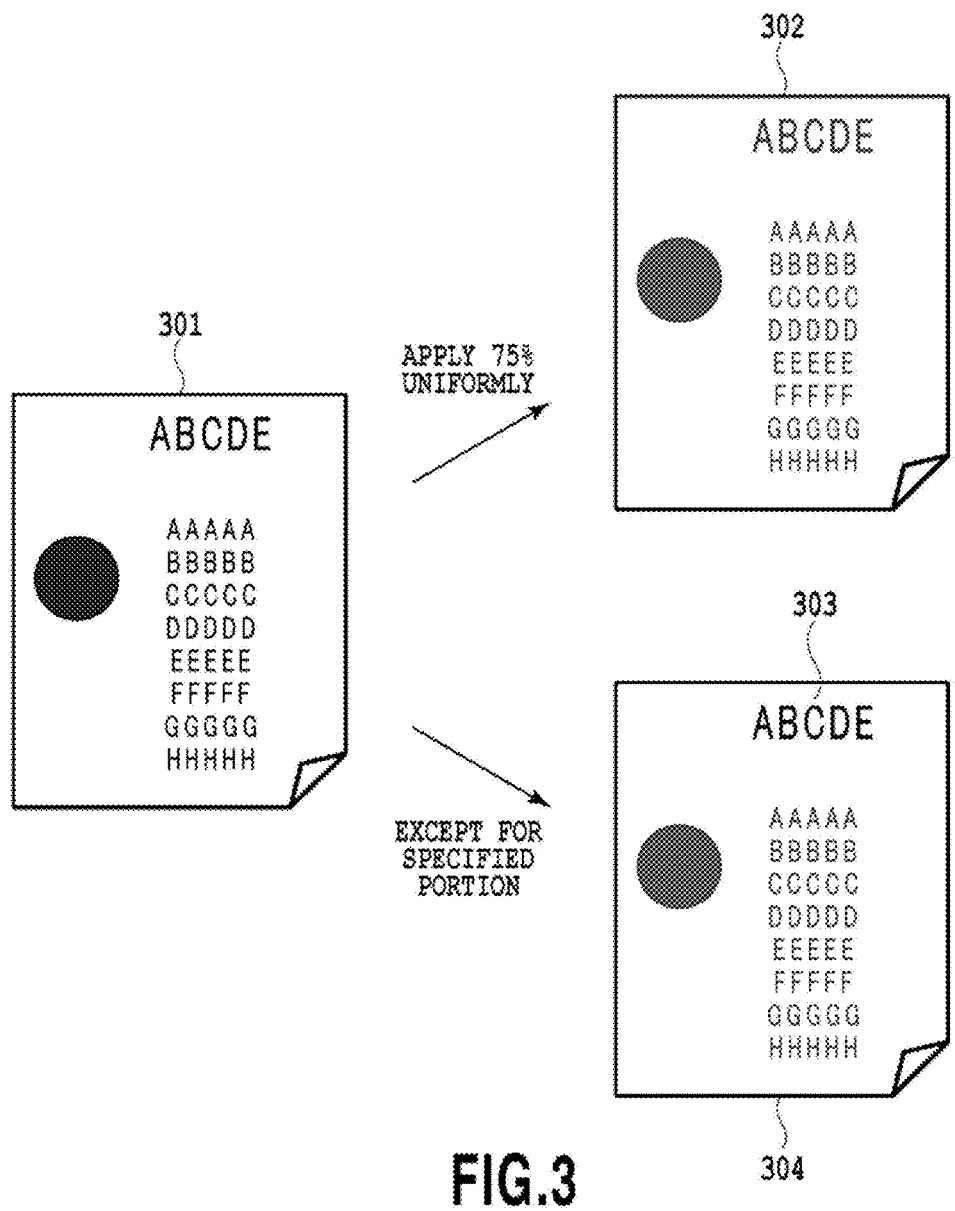
FIG. 3 shows exemplary printouts in toner save printing.

FIG. 3 shows exemplary printouts provided by the image processing apparatus 101.

The toner save printing (a mode of reducing an amount of color material used in printing) can be set in two ways. One is to set print settings of printer drivers installed on the host computers 102 and 103. A user can set a toner reduction rate in toner saving on a slider bar 601 for each print job, which is entered by pressing a button 602. This setting can be canceled by pressing a button 603. In other words, a toner reduction rate is set for each print job. The other is to set a toner reduction rate by using a screen of FIG. 6 displayed on the UI unit 206 of the image processing apparatus 101, as in the case of printer driver settings. In this case, the set toner reduction rate is applied to all printouts provided by the image processing apparatus 101, and a reduced amount of toner is used for all print jobs. On the slider bar 601, an example of "25%" means that toner usage is reduced by 25% compared to the toner usage in ordinary printing.

For example, once print data 301 is printed, a printout 302 is provided with a density 25% lower than that in ordinary printing throughout the page.

In this embodiment, the case of setting toner usage in the image processing apparatus 101 will be described.

[Registering an Excluded Object in Toner Save Printing]

Figure 7:
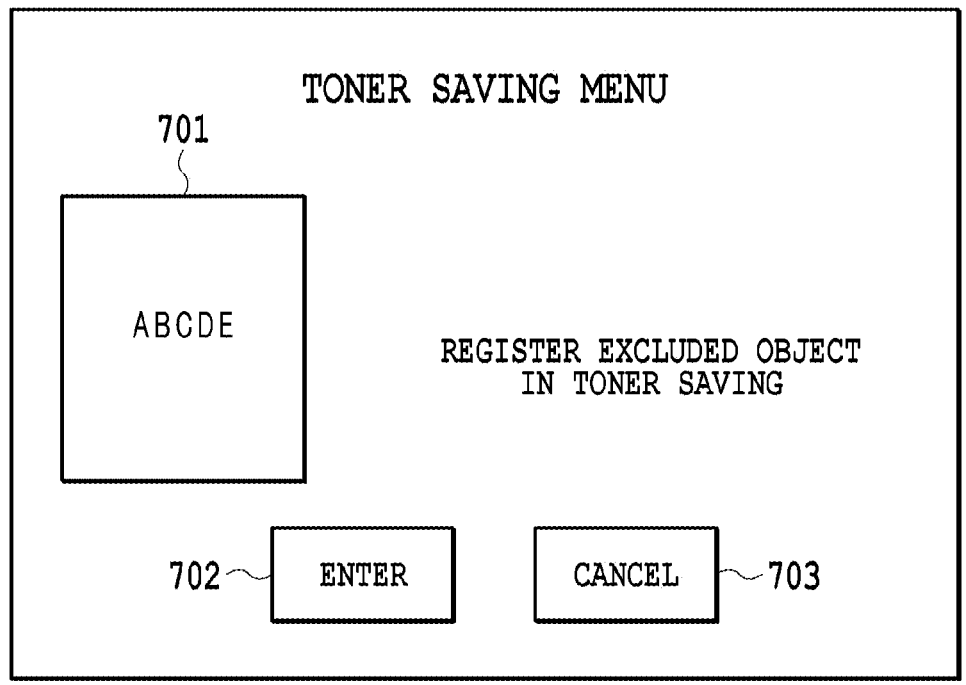
FIG. 7 shows an exemplary screen displayed on the UI unit.

FIG. 7 shows an exemplary screen displayed on monitors of the host computers 102 and 103 or the UI unit 206 of the image processing apparatus 101.

A user can register an object to which toner saving is not applied in toner save printing, namely, an excluded object. Toner saving processing is not performed on a registered and selected excluded object in printing. To register an object such as a character string or image data created by an application installed on the host computers 102 and 103 as an excluded object, first, a preview of the object appears in an area 701.

Once a user presses a button 702 to register the previewed object as an excluded objet, a system control unit 202 stores the previewed object in a memory unit 207 as an excluded object. This can be canceled (not to register the object) by pressing a button 703.

It has been described how to register an excluded object on the host computers 102 and 103, but not limited thereto. Alternatively, it is possible to read a document with a scanner provided with the image processing apparatus 101 to register an object included in the read image as an excluded object (to store an excluded object in the memory unit 207).

[Selecting an Excluded Object in Toner Save Printing]

Figure 8:
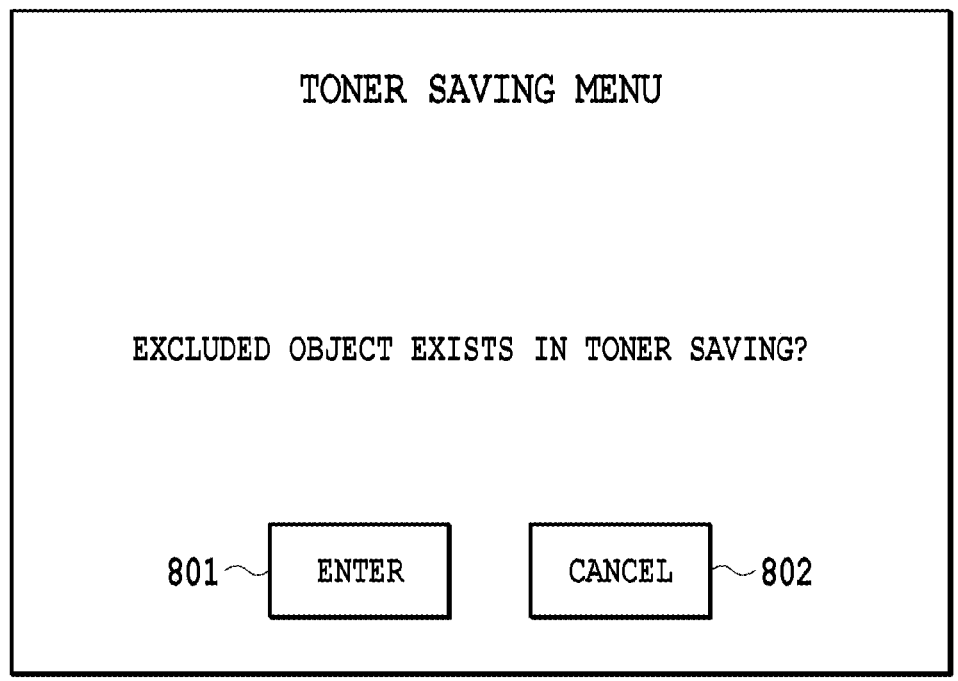
FIG. 8 shows an exemplary screen displayed on the UI unit.
Figure 9:
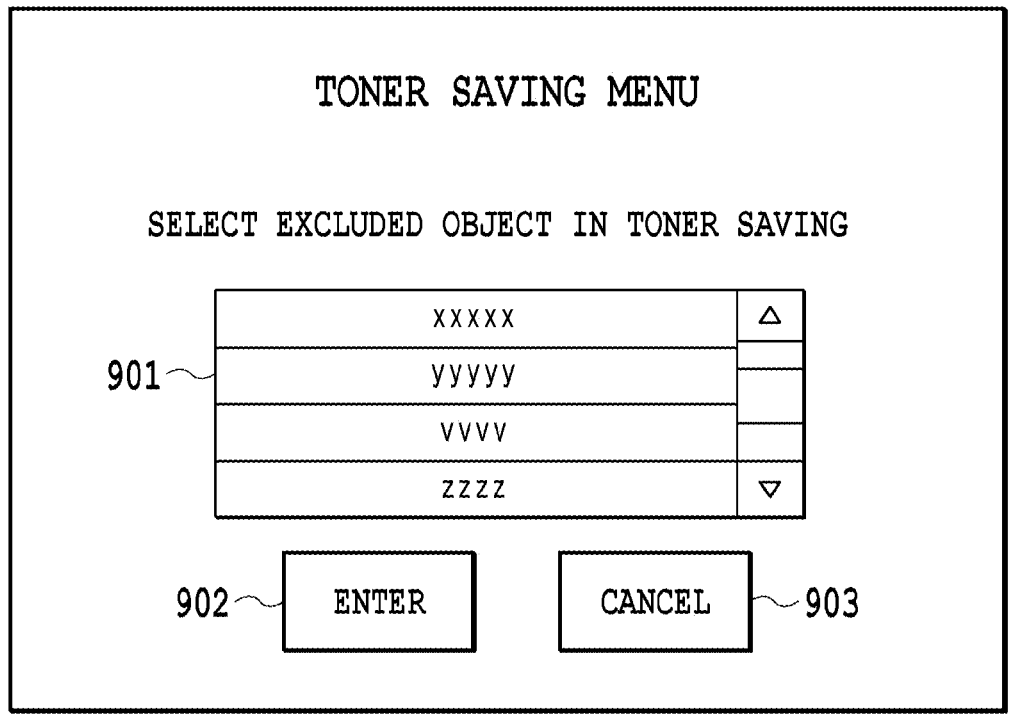
FIG. 9 shows an exemplary screen displayed on the UI unit.

FIGS. 8 and 9 show an exemplary screen displayed on monitors of the host computers 102 and 103 or the UI unit 206.

A user can select an object to which toner saving is not applied in toner save printing, namely, an excluded object. Once a user presses a button 801, a user interface for selecting an excluded object registered in advance appears. More particularly, Once the user presses the button 801, a list of excluded objects appears on a screen as shown in FIG. 9 so that the user can select an excluded object registered in the memory unit 207. The user then selects an excluded object from an area 901 and presses a button 902 to enter the excluded object. The selection of the excluded object can be cancelled by pressing a button 903. Among the objects included in the image data, toner saving is not applied to the objects corresponding to the selected excluded object in toner save printing. Once the user presses a button 802, no object is selected as an excluded object. In other words, the user can select at least one object as an excluded object on which toner saving processing is not performed from the objects included in the image data through the user interface.

For instance, once print data 301 is printed, a selected excluded object 303 is printed normally, and other portions are printed with a lower density (toner saved) in a printout 304. In this case, compared to toner usage for the excluded object 303 to which toner saving is not applied, toner usage for other portions is reduced in printing. Accordingly, the toner usage for the portions other than the excluded object 303 is less than "75%."

[Overview of Toner Save Printing]

Figure 4:
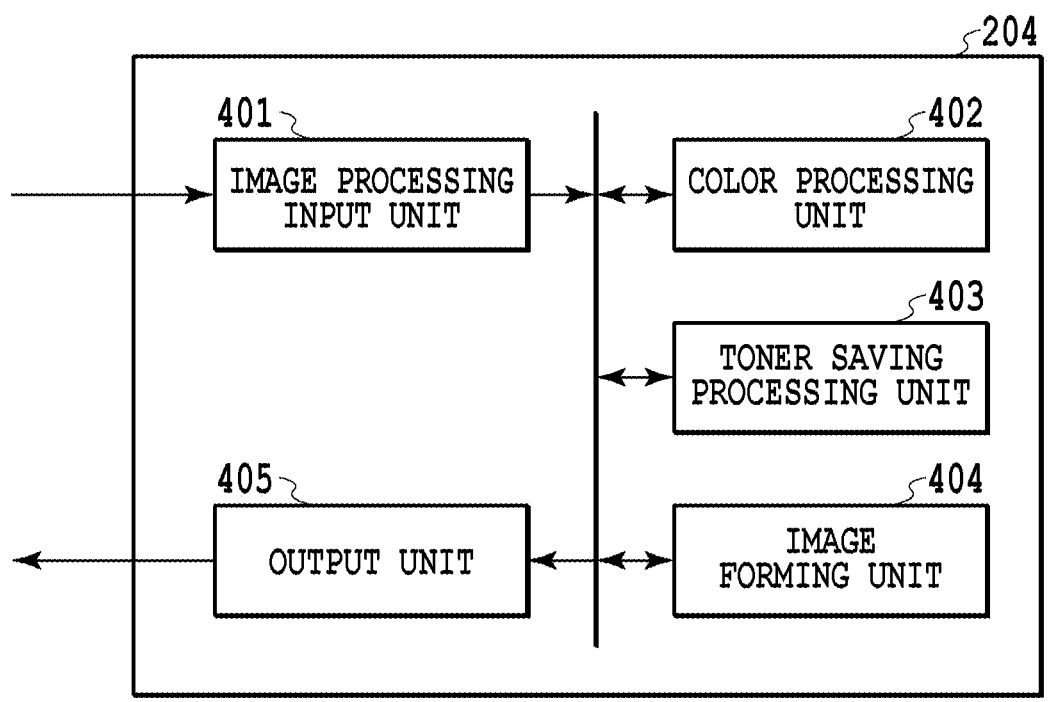
FIG. 4 is a block diagram showing a configuration of an image processing unit.

FIG. 4 is a block diagram showing a configuration of the image processing unit 204. The image processing unit 204 includes an image processing input unit 401, a color processing unit 402, a toner saving processing unit 403, an image forming unit 404, and an output unit 405.

Figure 5:
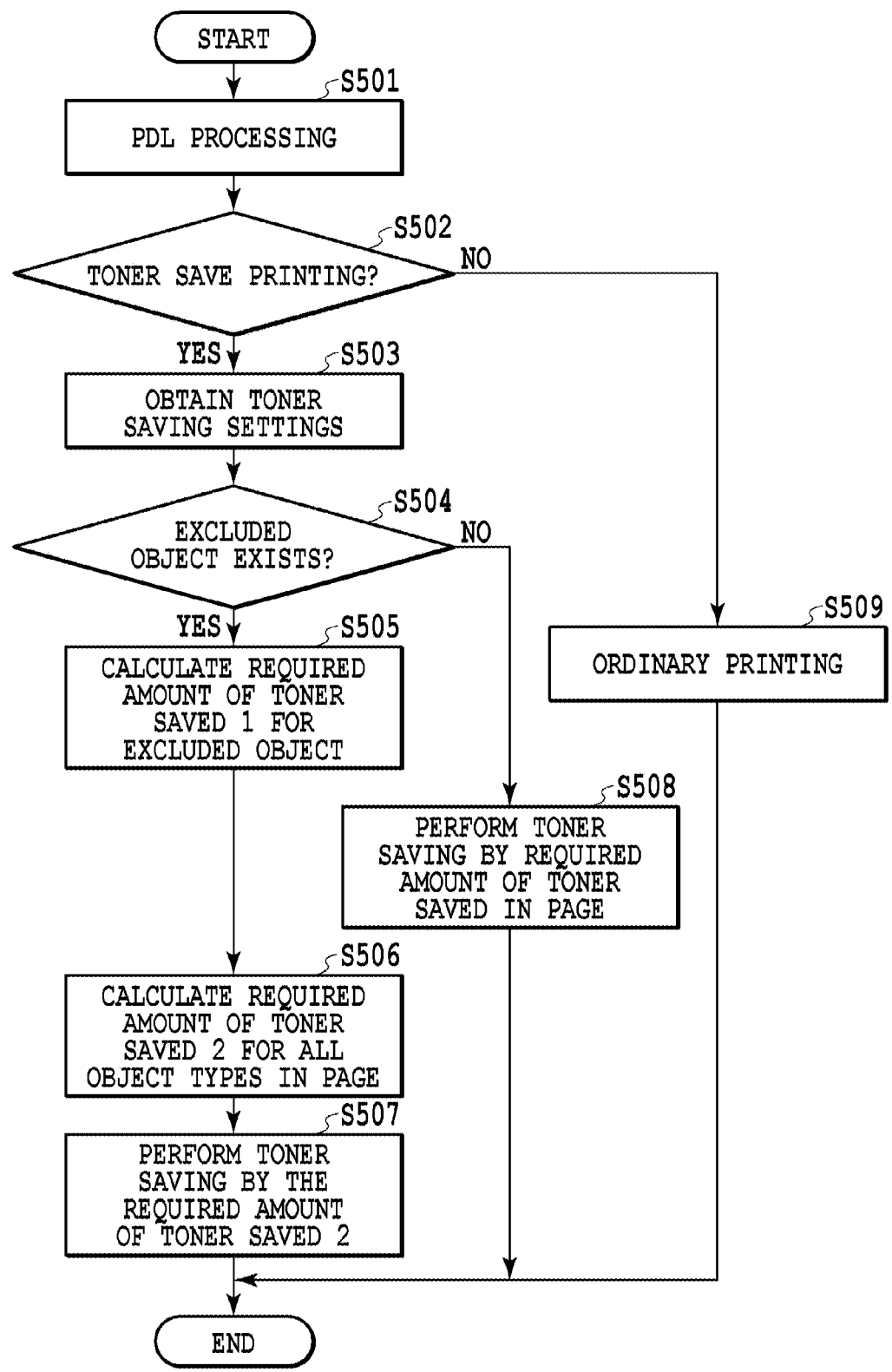
FIG. 5 is a flow chart showing an outline of processing in accordance with one embodiment.

FIG. 5 is a flow chart showing processing associated with constituent elements 201 to 209 of the image processing apparatus 101. This processing is executed by the system control unit 202 of the image processing apparatus according to a program stored in the memory unit such as a ROM 203 and achieved with control of operations in each element.

In step S501, the input unit 201 receives printer driver data sent from printer drivers in the host computer 102. The PDL processing unit 209 analyzes the received printer driver data and creates PDL language data for each printer driver. Then, the PDL processing unit 209 expands the PDL language data and creates bit map image data. The PDL processing unit 209 compresses the created bit map image data and transmits it to the toner save information processing unit 205. A common compression method (e.g., JPEG) is used.

In step S502, the system control unit 202 determines whether toner saving is set in the screen of FIG. 6 on the UI unit 206. In a case where toner saving is not set, in step S509, the system control unit 202 expands the compressed image data and transmits the bit map image data to the image processing unit 204. The transmitted bit map image data is received by the image processing input unit 401. Next, the system control unit 202 causes the color processing unit 402 to convert the bit map image data from RGB signals to CMYK signals. Finally, the system control unit 202 causes the image forming unit 404 to perform image forming processing on the bit map image data and transmits it to the output unit 405. Then, the system control unit 202 transmits to the print unit 208 the bit map image data on which the image processing was performed.

On the other hand, in a case where toner saving is set, in step S503, the system control unit 202 obtains a target toner reduction rate, setting information including whether to set an excluded object in toner saving, and information on the excluded object when set, which are set in the UI unit 206. A toner reduction rate (a first reduction rate) inputted by an input unit as shown in FIG. 6 is obtained by the system control unit 202 as the target toner reduction rate. The system control unit 202 transmits the obtained information to the toner save information processing unit 205.

In step S504, the system control unit 202 determines whether the excluded object set in the UI unit 206 (the excluded object selected through the screens shown in FIGS. 7, 8, and 9) is included in the bit map image data. As a method of determination, the system control unit 202 transmits the bit map data of the set excluded object stored in the memory unit 207 to the toner save information processing unit 205. The system control unit 202 determines whether an object corresponding to the bit map data of the excluded object exists in the bit map image data by using a general method such as pattern matching.

In a case where the bit map image data includes a portion corresponding to the bit map of the excluded object, the processing proceeds to step S505. In step S505, the system control unit 202 causes the toner save information processing unit 205 to calculate, in a case where toner reduction processing is also performed for printing the excluded object at the set target toner reduction rate, an amount of toner saved for the excluded object as a "required amount of toner saved 1".

Next, in step S506, the system control unit 202 causes the toner save information processing unit 205 to calculate a "required amount of toner saved 2" by adding the "required amount of toner saved 1" to a required amount of toner saved for the objects other than the excluded object to achieve the target toner reduction rate. In other words, the "required amount of toner saved 2" represents a required amount of toner saved in applying toner saving to all of the objects included in the bit map image data at the set target toner reduction rate (the first reduction rate). In this embodiment, this "required amount of toner saved 2" is set as a target amount of toner saved to be achieved for the objects other than the excluded object (other than the selected object).

The "required amount of toner saved 1" and the "required amount of toner saved 2" are calculated in a manner described below in detail. A toner consumption required for ordinary printing of an excluded object is denoted by $X(g)$. In a case where the toner reduction rate is set to "25%," the "required amount of toner saved 1" is equal to $X \times 0.25(g)$. Meanwhile, a toner consumption required for ordinary printing of objects other than an excluded object is denoted by $Y(g)$. In a case where the toner reduction rate is set to "25%," the "required amount of toner saved 2" is equal to $Y \times 0.25(g)$. Incidentally, a toner consumption $X(g)$ required for ordinary printing is obtained by the following process. First, a total value A is obtained by summing C, M, Y, and K values of respective picture elements in the bit map data to be printed. Given that an amount of toner consumed is in a linear relation with the total value A, the toner consumption $X(g)$ is obtained by $k \times A(g)$ (k is a coefficient).

As a result, a required amount of toner saved as newly set for objects other than the excluded object is equal to $X \times 0.25(g) + Y \times 0.25(g)$. Once the required amount of toner saved for the objects other than the excluded object is obtained, a toner reduction rate of Z % (a second reduction rate) for the objects other than the excluded object is calculated. The second reduction rate of Z % is calculated in a manner described below.

$$0.75(X+Y)=X+((100-Z/100)\times Y) \quad \text{Equation (1)}$$

The left side of equation (1) represents a toner consumption required in the case where toner is saved for all objects including an excluded object in the image data. The right side of equation (1) represents a toner consumption in the case where toner is not saved for the excluded object in the image data but toner is saved for the objects other than the excluded object. In this manner, the toner consumption saved is retained within a page regardless of whether an excluded object is specified.

In a case where a toner reduction rate set in the UI of FIG. 6 is denoted by M (%), a toner reduction rate Z (%) for the objects other than the excluded object can be obtained by the following equation (2):

$$Z(\%)=M\times((X+Y)/Y) \quad \text{Equation (2)}$$

A newly set toner reduction rate and the bit map image data are transmitted to the image processing unit 204. That is, in step S506, a toner reduction rate required for printing the objects other than the excluded object among the objects included in the bit map image data to achieve toner saving by the "required amount of toner saved 1" plus the "required amount of toner saved 2" is calculated as a second reduction rate.

In step S507, the system control unit 202 performs image processing according to the new toner reduction rate on the bit map image data received by the image processing unit 204. In other words, the image processing is performed on the objects other than the excluded object so that the second reduction rate is achieved. Particularly, the system control unit 202 causes the image processing input unit 401 to receive the bit map image data. Then, the system control unit 202 causes the color processing unit 402 to convert the bit map image data from RGB signals to CMYK signals. Then, the system control unit 202 causes the toner saving processing unit 403 to perform toner saving processing on the bit map image data from which an excluded object of the CMYK signals is excluded with a setting of a target toner reduction rate (a second reduction rate). More particularly, for each CMYK signal value for each picture element included in the bit map image data, the following calculation is performed: an output signal value=an input signal value×Z/100. In this case, toner saving processing is not performed on the excluded object. Finally, the system control unit 202 causes the image forming unit 404 to perform image forming processing on the bit map image data, and transmits its result to the output unit 405. Then, the system control unit 202 transmits to the print unit 208 the bit map image data on which the image processing was performed.

On the other hand, in step S504, in a case where it is determined that no excluded object is included in the bit map image data, the system control unit 202 causes the image processing input unit 401 to receive the bit map image data in step S508. Then, the system control unit 202 causes the color processing unit 402 to convert the bit map image data from RGB signals to CMYK signals. Then, the system control unit 202 causes the toner saving processing unit 403 to perform toner saving processing on the bit map image data of the CMYK signals by a target amount of toner saved. Finally, the system control unit 202 causes the image forming unit 404 to perform image forming processing on the bit map image data, and transmits its result to the output unit 405. Then, the system control unit 202 transmits to the print unit 208 the bit map image data on which the image processing was performed.

Then, the system control unit 202 causes the print unit 208 to print the bit map image data on which the image processing was completed.

As described above, in the present embodiment, an object on which toner saving processing is not performed (an excluded object) is selected from image data to be printed, and an amount of toner saved for achieving a target toner reduction rate for objects other than the excluded object is calculated. Then, toner saving processing for achieving the calculated amount of toner saved is performed on the objects other than the excluded object.

As a result, in toner save printing, a user can achieve a desired image quality while controlling toner consumptions.

Second Embodiment

In addition to the method for achieving a target amount of toner saved as the first embodiment, in a case where a target amount of toner saved is set for each object, it is desirable to achieve the target amount of toner saved for the same object type as the excluded object.

[Process of Instructions for Toner Save Printing]

Figure 10:
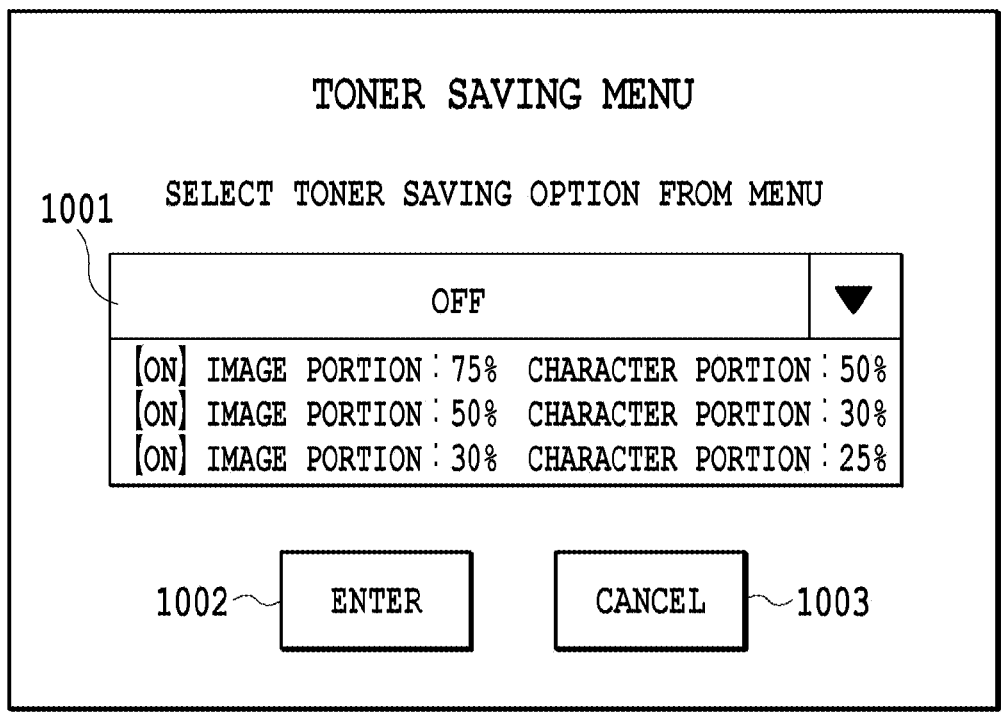
FIG. 10 shows an exemplary screen displayed on the UI unit.

FIG. 10 shows an exemplary screen displayed on monitors of the host computers 102 and 103 or the UI unit 206 of the image processing apparatus 101.

Every time a user wants to print data, the user sets an amount of toner used in toner saving on a pull-down menu 1001 and enters it by pressing a button 1002. This can be canceled by pressing a button 1003. On the pull-down menu 1001, an amount of toner used in toner saving appears for each image portion and character portion.

Figure 11:
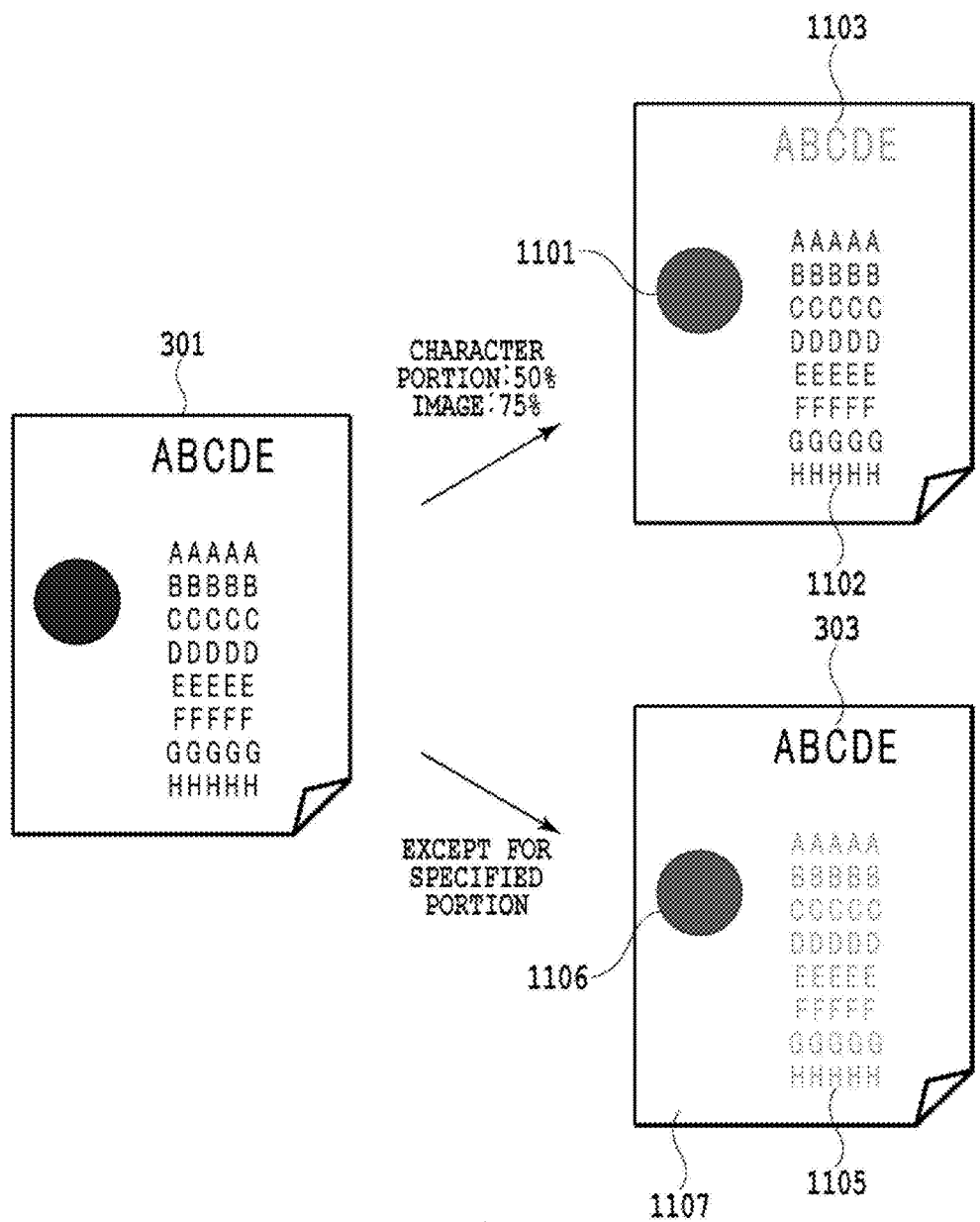
FIG. 11 shows exemplary printouts in toner saving printing.

FIG. 11 shows exemplary printouts of print data 301 from the image processing apparatus 101 in a case where, for example, reduction rates of 75% and 50% are set for the image portion and the character portion, respectively, in the pull-down menu 1001. The example shows that a printout 1103 including an image portion 1101 having a density 25% lower than usual and a character portion 1102 having a density 50% lower than usual is provided.

[Selecting an Excluded Object in Toner Save Printing]

When a user prints the print data 301, the user sets a reduction rate of 50% for the character portion and a reduction rate of 75% for the image portion on the pull-down menu 1001 and selects "ABCDE" as an excluded object 303. Accordingly, toner is not saved for the excluded object 303 "ABCDE" and the excluded object 303 is printed as usual. Since the excluded object 303 is the same type as a character portion 1105, toner saving applied to the character portion 1105 includes the amount of toner saved for the excluded object 303, and thus the density of the character portion 1105 is lower than "50%." A printout 1107 is provided with an image portion 1106 having a density reduced by 25% as set.

[Overview of Toner Save Printing]

Figure 12:
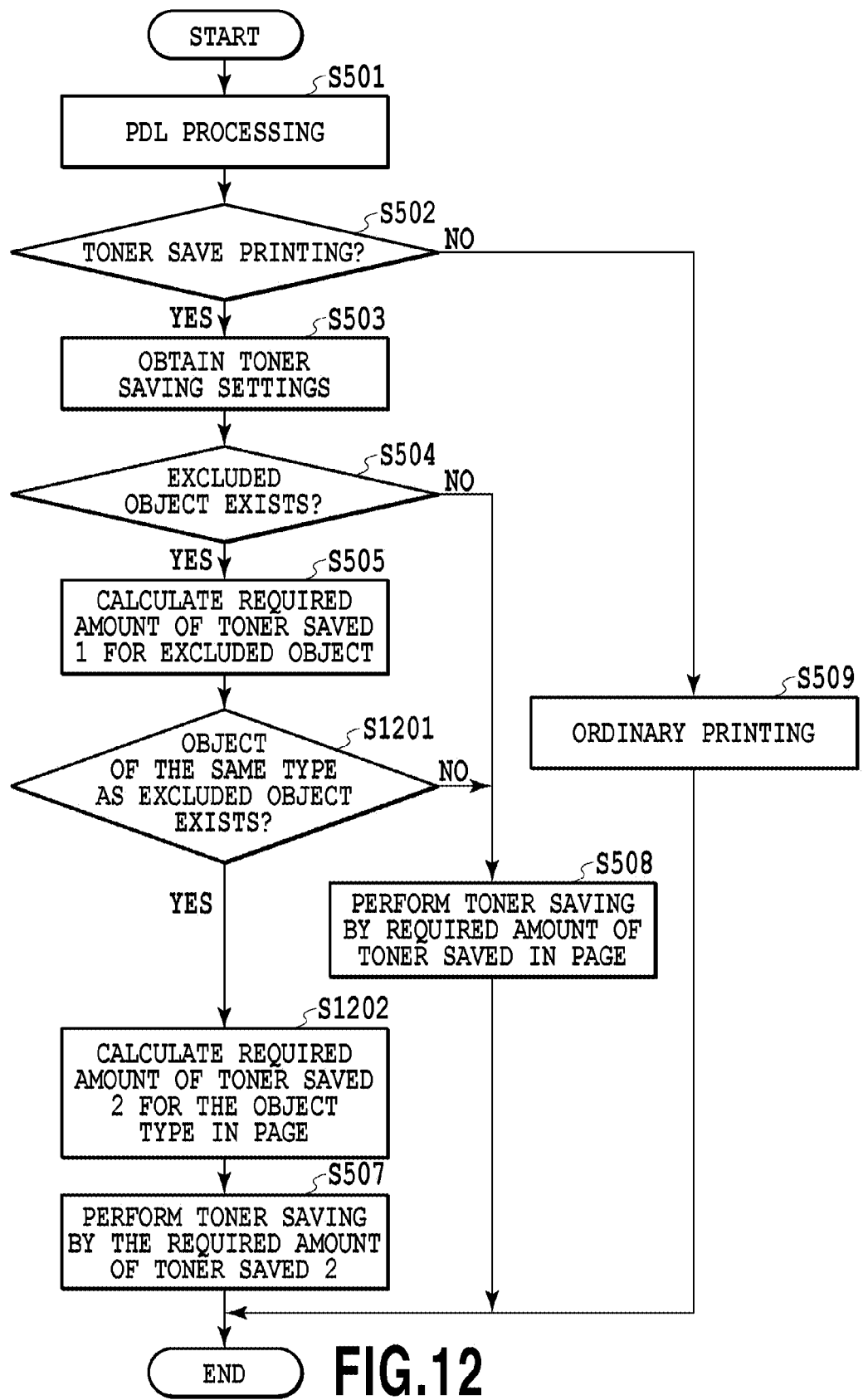
FIG. 12 is a flow chart showing an outline of processing in accordance with one embodiment.

FIG. 12 is a flow chart showing processing in the constituent elements 201 to 209 of the image processing apparatus 101 in accordance with the second embodiment. This processing is executed by the system control unit 202 of the image processing apparatus according to a program stored in the ROM 203 and achieved with control of the processing in the constituent elements 201 to 209.

Other than steps S1201 and S1202, the description of the processing is omitted hereinafter as it is the same as the first embodiment.

In step S1201, the system control unit 202 causes the toner save information processing unit 205 to select an object of the same type as an object specified as an excluded object from the objects included in the bit map image data to be printed. In step S501, the system control unit 202 causes the PDL processing unit 209 to add one or more bits of object recognition signals capable of recognizing an object type in creating bit map image data. For instance, the signal "0" for an image portion and the signal "1" for a character portion are added to the bit map image data. For selection, the system control unit 202 causes the toner save information processing unit 205 to compare the object recognition signals indicated by an object specified as an excluded object and the object recognition signals indicated by other objects to select the objects of the same type. In a case where it is determined that there exists the same type of object, the processing proceeds to step S1202.

In step S1202, the system control unit 202 causes the toner save information processing unit 205 to calculate a "required amount of toner saved 2" which is required for achieving a target amount of toner saved for objects other than an excluded object among the objects of the same type as the excluded object in the bit map image. More particularly, in step S503, a different reduction rate (a first reduction rate) is obtained for each type of object included in image data. Accordingly, a target amount of toner saved for objects of the same type as the excluded object can be obtained based on this reduction rate. In step S1202, based on this target amount of toner saved, the "required amount of toner saved 2" is calculated as a target amount of toner saved to be achieved for the objects other than the excluded object among the objects of the same type as the excluded object. Then, a toner reduction rate required for achieving the toner saving by the "required amount of toner saved 1" plus the "required amount of toner saved 2" for printing the objects other than the excluded object among the objects of the same type as the excluded object is calculated as a second reduction rate.

The target amount of toner saved as newly set and the bit map image data are transmitted to the image processing unit 204. Then, in step S507, image processing is performed on the objects other than the excluded object among the objects of the same type as the excluded object so that the second reduction rate is achieved.

For the objects of a type different from the excluded object, toner saving is performed by a target amount of toner saved as set.

As described above, in a case where a target amount of toner saved is set for each object by a user, a new target amount of toner saved is calculated only for the object type to which the excluded object belongs. In this manner, it is possible to obtain the same image quality as in the usual toner saving for the different object type.

Third Embodiment

In addition to the process described in the first embodiment, it is preferable that there are many processes for selecting an excluded object. In this embodiment, a process for selecting an excluded object that is different from the one described in the first embodiment will be described.

Figure 13:
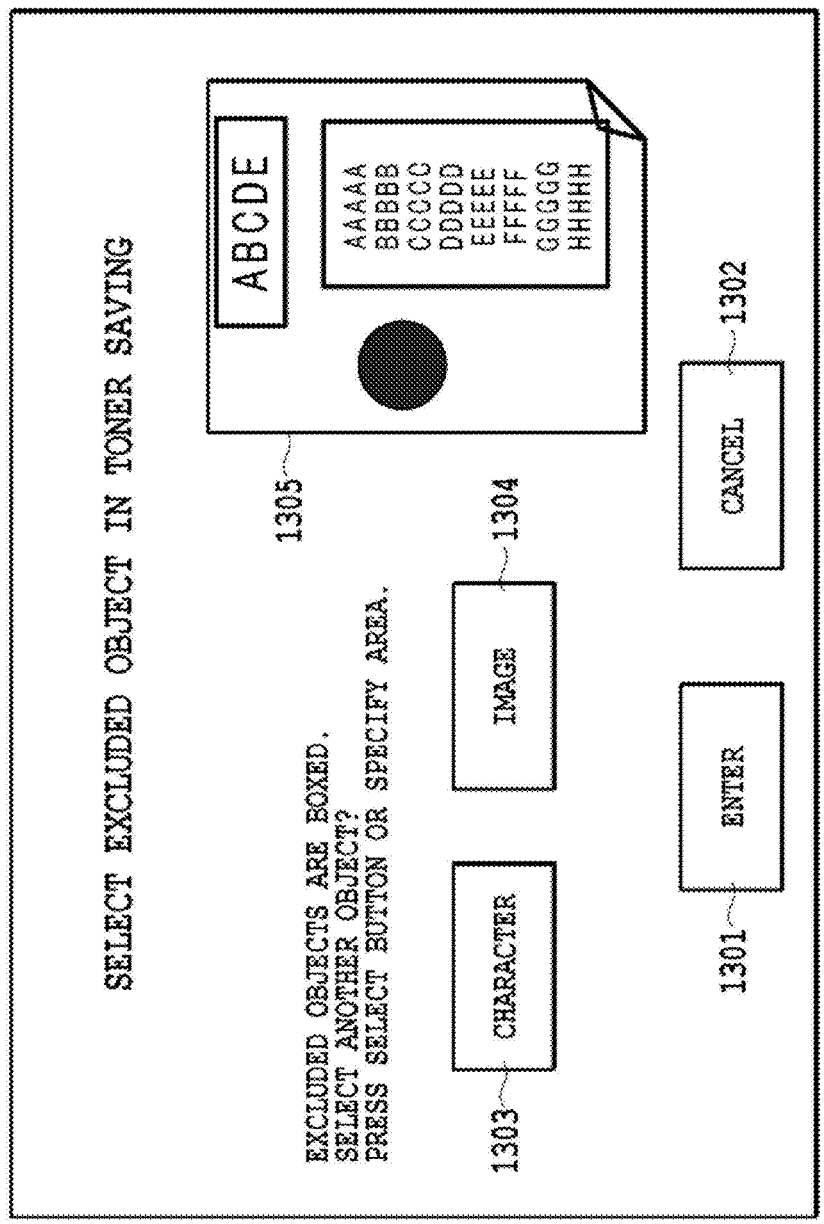
FIG. 13 shows an exemplary screen displayed on the UI unit.

FIGS. 13 and 14 show an exemplary screen displayed on monitors of the host computers 102 and 103 or the UI unit 206 of the image processing apparatus 101.

A user can check a preview of an excluded object in an area 1305. In FIGS. 13 and 14, boxed portions define excluded objects. The user can select an object shown in the area 1305 as an excluded object through the UI unit 206. The user can also register the selected object as an excluded object by pressing a button 1301. That is, the user can select and register an object in an area in the image data as an excluded object.

The user can register a character object as an excluded object by pressing a button 1303. The user can also register an image object (an object not including characters) as an excluded object by pressing a button 1304. The user can register a selected object type as an excluded object by pressing the button 1301. This can be canceled by pressing a button 1302. That is, the user can select and register an object based on a type of object as an excluded object to be registered.

Next, described is a process according to a screen of FIG. 14 displayed by pressing the button 1303. All character objects are selected by pressing a button 1401. The user can enter a keyword in an area 1403 by pressing a button 1402. In a case where the user enters a keyword and presses the button 1301, the keyword becomes an excluded object. Based on information interpreted in the PDL processing of step S501, image data is searched for the same keyword as the entered keyword. Incidentally, optical character recognition (OCR) may be performed on the area 1305 to search for characters corresponding to the entered keyword. In this manner, the user can select and register an object based on a keyword as an object to be registered. Note that the screen as shown in FIG. 14 may appear not only when the button 1303 is pressed (that is, after the screen as shown in FIG. 13 appears) but also in any timing.

As described above, it is possible to select an excluded object for toner saving by previewing input image in addition to entering bit map data.

Fourth Embodiment

In addition to the process described in the first embodiment, it is preferable that toner saving is performed by a target amount of toner saved as newly calculated to determine whether visibility decreases, and performs toner saving according to its determination result. In this embodiment, such a process for performing toner saving processing will be described.

Figure 16:
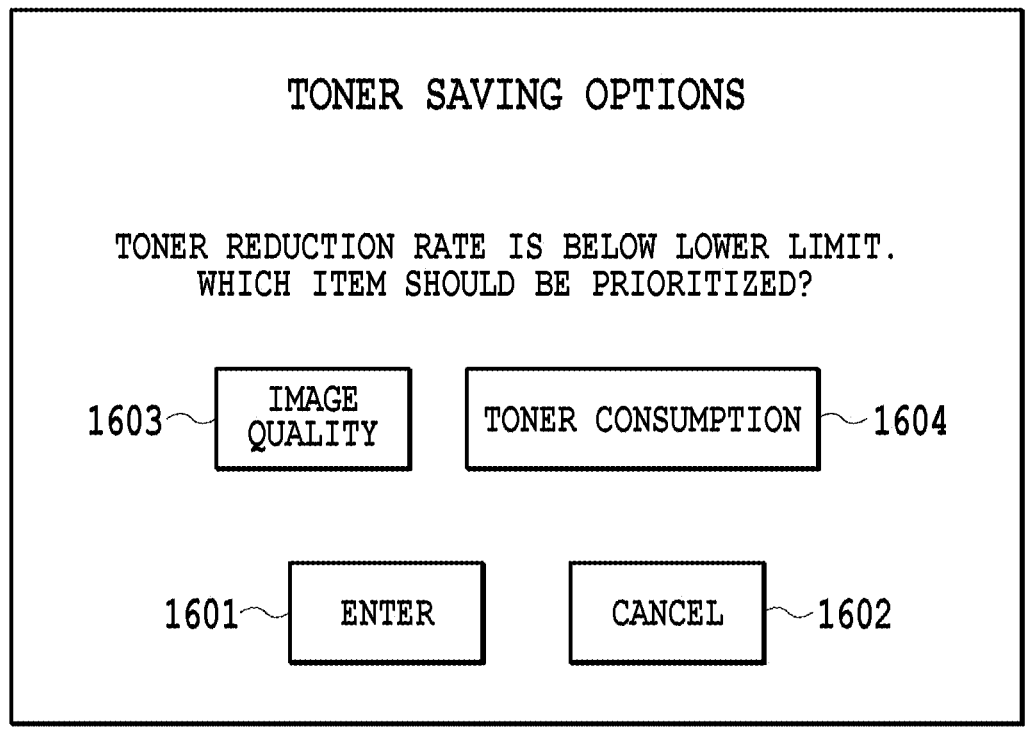
FIG. 16 shows an exemplary screen displayed on the UI unit.
Figure 17:
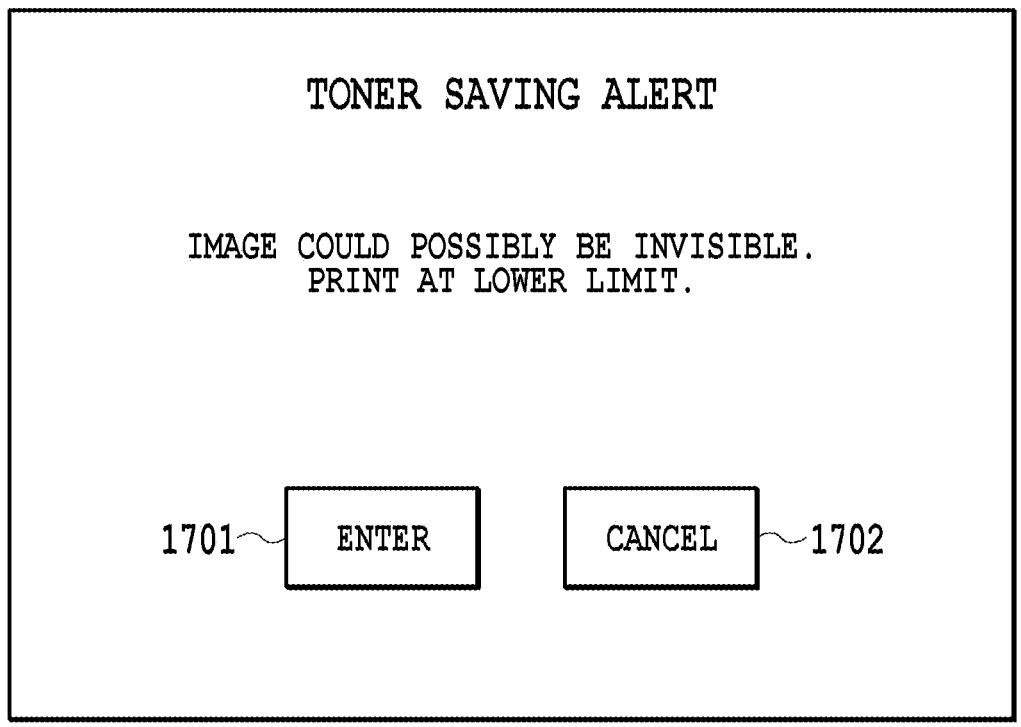
FIG. 17 shows an exemplary screen displayed on the UI unit.

FIGS. 16 and 17 show an exemplary screen displayed on monitors of the host computers 102 and 103 or the UI unit 206 of the image processing apparatus 101.

Figure 15B:
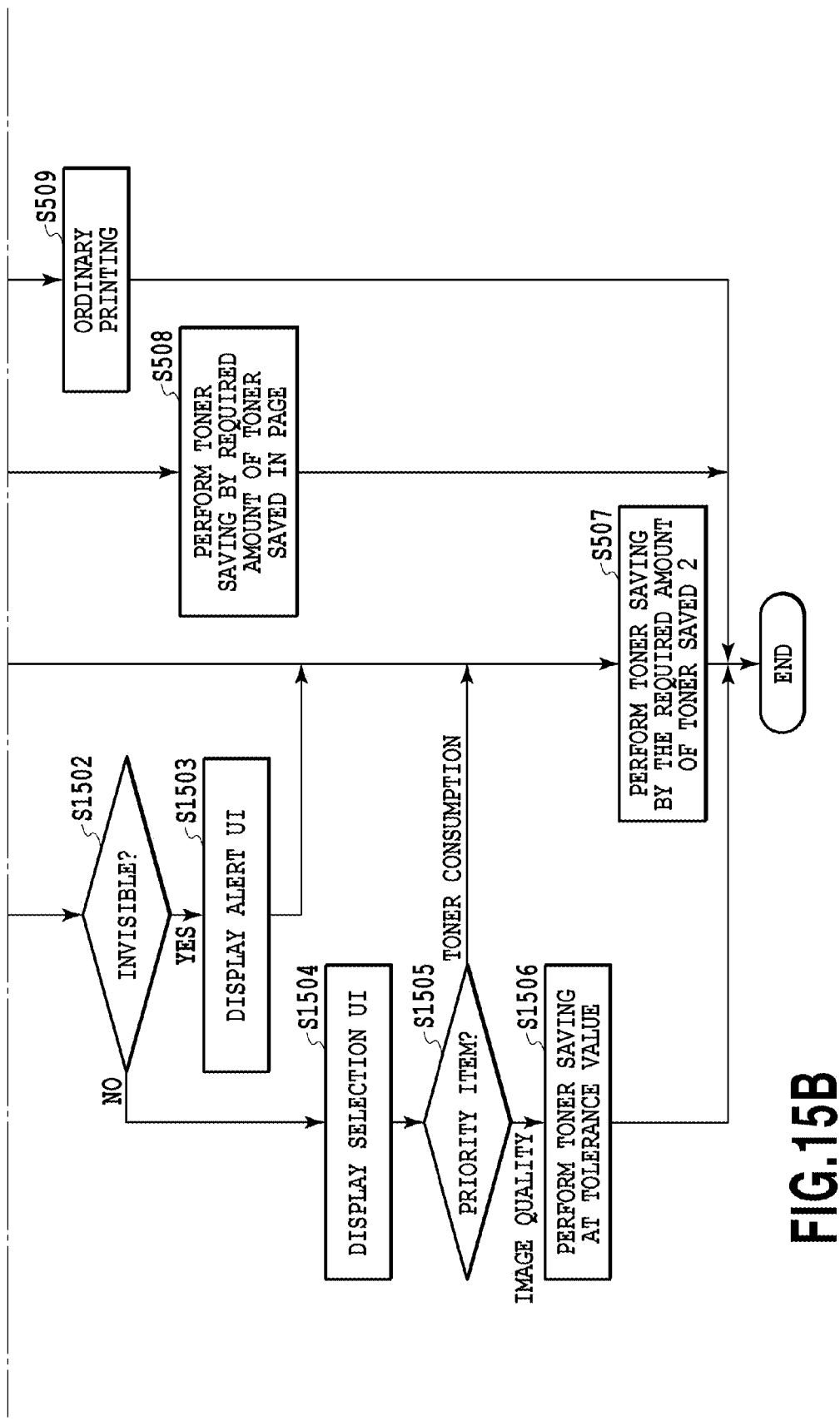
FIG. 15B is a flow chart showing an outline of processing in accordance with one embodiment.

FIGS. 15A and 15B are flow charts showing processing associated with constituent elements 201 to 209 of the image processing apparatus 101 in the fourth embodiment. This processing is executed by the system control unit 202 of the image processing apparatus 101 according to a program stored in the ROM 203 or the like and achieved with control of operations by the constituent elements 201 to 209. For steps S501 to S509, the description of the processing is omitted hereinafter as it is the same as the first embodiment.

In step S1501, the system control unit 202 causes the toner save information processing unit 205 to compare an acceptable value at which a preregistered visibility is retained and a "required amount of toner saved 2" (or a toner reduction rate (a second reduction rate) calculated based on the required amount of toner saved 2). Note that this "acceptable value" is preset as an amount of toner saved (or a toner reduction rate) at which visibility of a print is retained even if the toner usage is reduced. In other words, in step S1501, it is determined whether the required amount of toner saved 2 (or the second reduction rate) is greater than the acceptable value as preset in light of visibility of a print.

As a result of comparison, in a case where it is determined that the required amount of toner saved 2 is equal to or smaller than the acceptable value (visibility is retained) in step S1501, toner saving processing is performed by the "required amount of toner saved 2" (or the second reduction rate) in step S507.

In step S1501, in a case where it is determined that the required amount of toner saved 2 is greater than the acceptable value (visibility is not retained), the system control unit 202 displays on the UI unit 206 an alert indicating that the required amount of toner saved 2 exceeds the acceptable value at which visibility is retained, and performs toner saving processing according to an instruction by a user. More particularly, first in step S1502, the system control unit 202 causes the toner save information processing unit 205 to determine whether an image after toner saving processing could be invisible as a result of toner saving processing.

In a case where it is determined that the image after the toner saving processing is invisible (in a case where it is determined that the toner reduction rate is equal to or greater than a lower limit) in step S1502, an alert screen of FIG. 17 is displayed on the UI unit 206. Once a button 1701 is pressed, the required amount of toner saved 2 is replaced with the lower limit, and then the toner saving processing is performed at the lower limit in step S507. This can be canceled by pressing a button 1702. Note that the lower limit is a value smaller than the acceptable value and at which the visibility of an image is maintained.

In a case where it is determined that the image after the toner saving processing will not be invisible (In a case where it is determined that the toner reduction rate is lower than a lower limit) in step S1502, an alert screen of FIG. 16 is displayed on the UI unit 206. In other words, the UI unit 206 displays an alert as well as a prompt to a user for a selection of a method for reducing a toner amount. A button 1603 is pressed to select the priority to image quality in the determination in step S1505, and in step S1506, the system control unit 202 transmits an acceptable value at which a preset visibility is retained to the image processing unit 204. A button 1604 is pressed to select the priority to toner consumptions in the determination in step S1505, and in step S507, the system control unit 202 transmits the "required amount of toner saved 2" to the image processing unit 204.

As described above, it is possible to perform toner saving processing while determining visibility.

Note that in the first to fourth embodiments, toner saving processing is performed on data transmitted by the host computer 102. However, the toner saving processing may be performed on data read by a copying machine or a scanner.

Further, the first to fourth embodiments have described the toner saving processing to save toner. This may be applied to ink used for ink jet printers or ink saving processing for saving ink. Toner and ink are used as color materials in this embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-051716, filed Mar. 8, 2012, which is hereby incorporated by reference herein in its entirety.

What is claimed is:

1. An image processing apparatus comprising:
    an obtaining unit for obtaining a reduction rate of color material as a first reduction rate in a case where a mode is set to reduce an amount of color material used for printing;

a selection unit for selecting at least one object on which color material reduction processing is not performed from objects included in image data to be printed;
a calculation unit for calculating an amount of color material reduced when reducing an amount of color material used for printing the objects included in the image data at the first reduction rate; and
a processing unit for performing color material reduction processing on objects other than the selected object such that an amount of color material used for printing the objects other than the selected object is reduced by the amount of color material reduced which is calculated by the calculation unit while not performing the color material reduction processing on the selected object, wherein
the obtaining unit obtains the reduction rate for each type of object included in the image data as the first reduction rate,
the calculation unit calculates an amount of color material reduced when reducing an amount of color material used for printing objects of the same type as the object selected by the selection unit which are included in the image data at the first reduction rate, and
the processing performs color material reduction processing on the objects of the same type as the selected object other than the selected object such that an amount of color material used for printing the objects of the same type as the selected object other than the selected object is reduced by the amount of color material reduced which is calculated by the calculation unit while not performing the color material reduction processing on the selected object.

2. The image processing apparatus according to claim 1, further comprising:
a unit for calculating an amount of color material used for printing the selected object and an amount of color material used for printing objects other than the selected object prior to the color material reduction processing,
wherein the processing unit calculates a second reduction rate indicating a reduction rate of the color material used for the objects other than the selected object based on the amounts of color material calculated by the unit for calculating and the first reduction rate, and performs the color material reduction processing at the second reduction rate.

3. The image processing apparatus according to claim 1, wherein the selection unit includes at least one of a unit for selecting an object from a list, a unit for selecting an object according to an object type, a unit for selecting an object according to a keyword, and a unit for selecting an object according to an area within the image data.

4. An image processing apparatus comprising:
an obtaining unit for obtaining a reduction rate of color material as a first reduction rate in a case where a mode is set to reduce an amount of color material used for printing;
a selection unit for selecting at least one object on which color material reduction processing is not performed from objects included in image data to be printed;
a unit for calculating an amount of color material used for printing the selected object and an amount of color material used for printing objects other than the selected object prior to the color material reduction processing;
a calculation unit for calculating an amount of color material reduced when reducing an amount of color material used for printing the objects included in the image data at the first reduction rate; and
a processing unit for performing color material reduction processing on objects other than the selected object such that an amount of color material used for printing the objects other than the selected object is reduced by the amount of color material reduced which is calculated by the calculation unit while not performing the color material reduction processing on the selected object,
wherein the processing unit calculates a second reduction rate indicating a reduction rate of the color material used for the objects other than the selected object based on the amounts of color material calculated by the unit for calculating and the first reduction rate, and performs the color material reduction processing at the second reduction rate, and
wherein the image processing apparatus further comprises:
a unit for determining whether the second reduction rate is greater than an acceptable value preset in light of visibility of a print; and
a display unit for displaying an alert indicating that the second reduction rate exceeds the acceptable value in a case where it is determined that the second reduction rate is greater than the acceptable value,
wherein, in a case where the alert is displayed, the processing unit selects performing color material reduction processing at the second reduction rate or performing color material reduction processing at a reduction rate equal to the acceptable value according to an instruction by a user, and performs the color material reduction processing at the selected reduction rate.

5. The image processing apparatus according to claim 4, wherein the display unit displays the alert as well as a prompt for a selection of a method for reducing an amount of color material.

6. An image processing method, comprising:
a step of obtaining a reduction rate of a color material for each type of object included in image data to be printed as a first reduction rate in a case where a mode is set to reduce an amount of color material used for printing;
a step of selecting at least one object on which color material reduction processing is not performed from objects included in image data to be printed;
a step of calculating an amount of color material reduced when reducing an amount of color material used for printing the objects included in the image data of the same type as the selected object at the first reduction rate; and
a step of performing color material reduction processing on objects of the same type of the selected object other than the selected object such that an amount of color material used for printing the objects other than the selected object is reduced by the amount of color material reduced which is calculated in the step of calculating while not performing the color material reduction processing on the selected object.

7. A non-transitory computer-readable storage medium storing a program for causing a computer to perform the image processing method according to claim 6.

8. An image processing method, comprising:
a step of obtaining a reduction rate of a color material as a first reduction rate in a case where a mode is set to reduce an amount of color material used for printing;
a step of selecting at least one object on which color material reduction processing is not performed from objects included in image data to be printed;
a step of calculating an amount of color material used for printing the selected object and an amount of color material used for printing objects other than the selected object prior to the color material reduction processing;

a step of calculating an amount of color material reduced when reducing an amount of color material used for printing the objects included in the image data at the first reduction rate;

a step of calculating a second reduction rate indicating a reduction rate of the color material used for the objects other than the selected object based on the calculated amounts of color material and the first reduction rate;

a step of determining whether the second reduction rate is greater than an acceptable value present in light of visibility of a print;

a step of displaying an alert indicating that the second reduction rate exceeds the acceptable value in a case where it is determined that the second reduction rate is greater than the acceptable value;

a step of selecting performing color material reduction processing at the second reduction rate or performing color material reduction processing at a reduction rate equal to the acceptable value according to an instruction by a user, and performing the color material reduction processing at the selected reduction rate.

9. A non-transitory computer-readable storage medium storing a program for causing a computer to perform the image processing method according to claim 8.

* * * * *